Aug. 22, 1961     A. A. WHITE     2,996,934
DIFFERENTIAL STEERING CONTROL
Filed Nov. 10, 1958     5 Sheets-Sheet 1
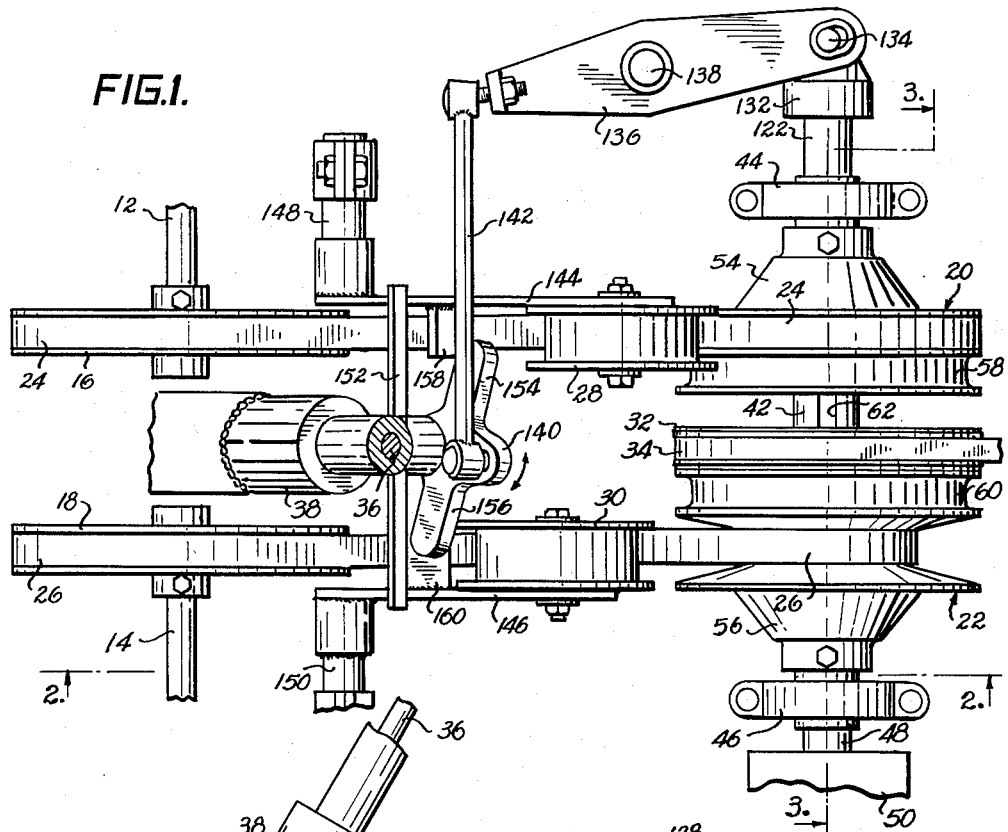
FIG.1.
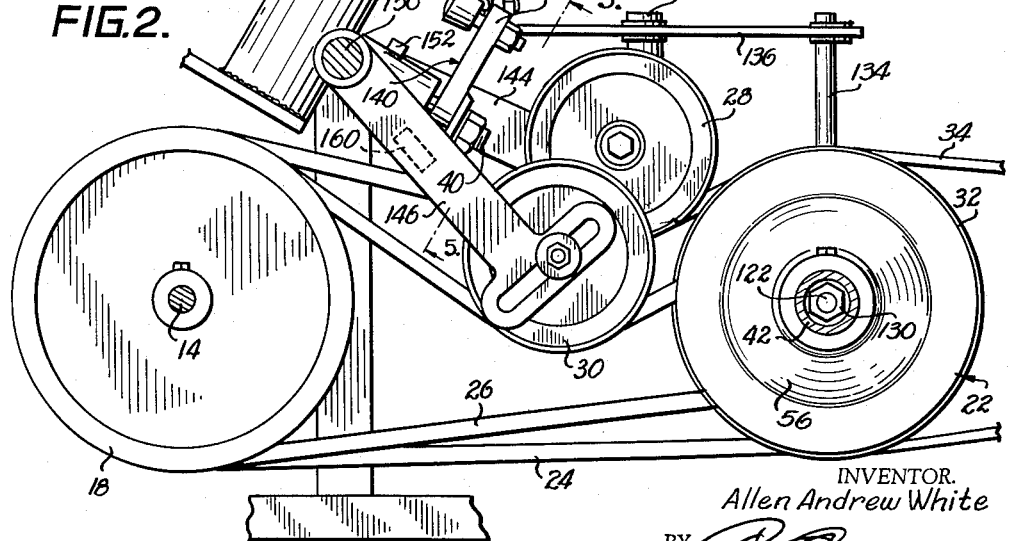
FIG.2.
INVENTOR.
Allen Andrew White
BY
ATTORNEY.

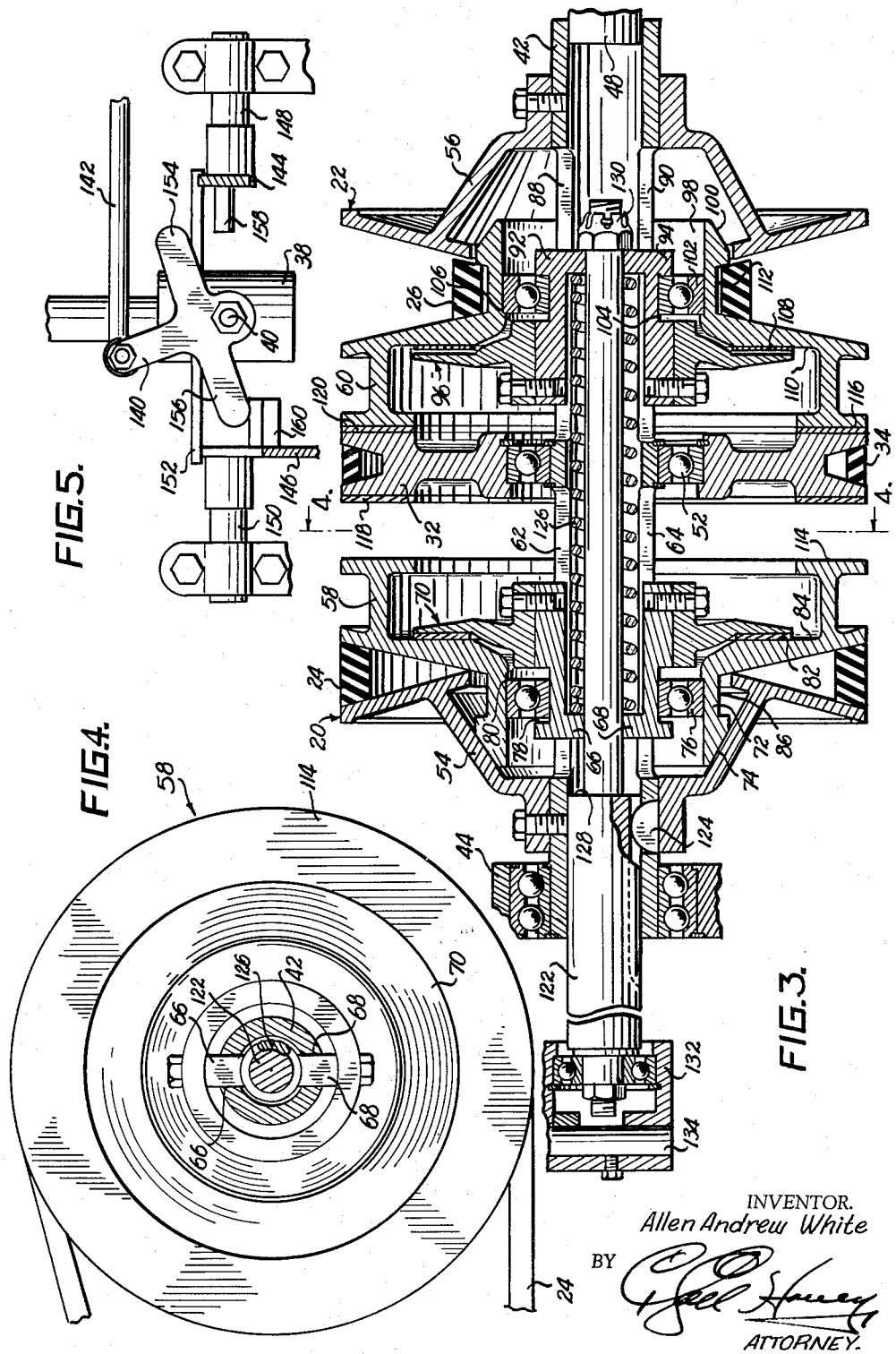

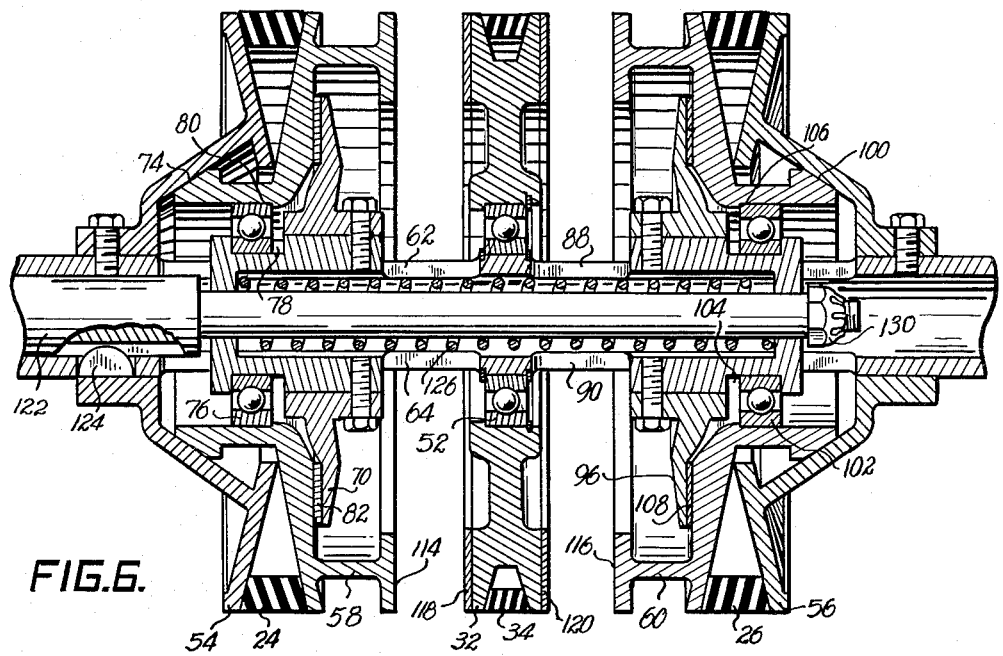
FIG.6.
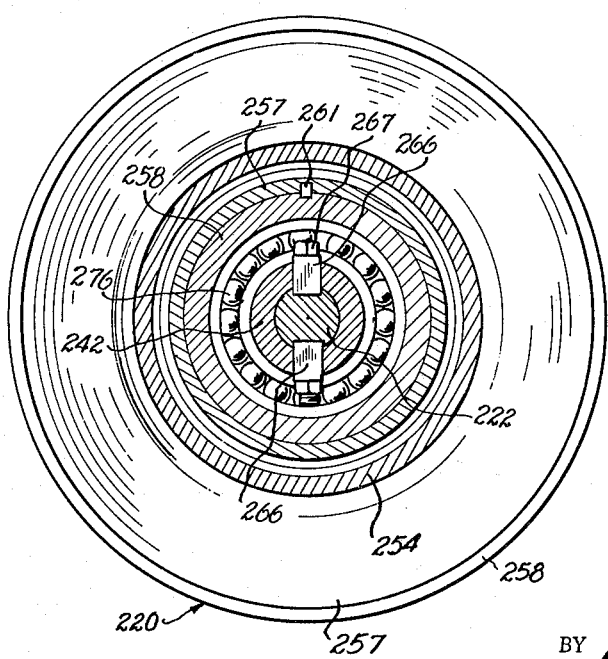
FIG.9.
INVENTOR.
Allen Andrew White
BY
ATTORNEY.

Aug. 22, 1961     A. A. WHITE     2,996,934
DIFFERENTIAL STEERING CONTROL
Filed Nov. 10, 1958     5 Sheets-Sheet 4

INVENTOR.
Allen Andrew White
BY
ATTORNEY.

Aug. 22, 1961  A. A. WHITE  2,996,934
DIFFERENTIAL STEERING CONTROL
Filed Nov. 10, 1958  5 Sheets-Sheet 5

INVENTOR.
Allen Andrew White
BY
ATTORNEY.

2,996,934
Patented Aug. 22, 1961

1

2,996,934
DIFFERENTIAL STEERING CONTROL
Allen Andrew White, Peabody, Kans., assignor to Hesston Manufacturing Co., Inc., Hesston, Kans., a corporation of Kansas
Filed Nov. 10, 1958, Ser. No. 772,762
20 Claims. (Cl. 74—722)

This invention relates to improved apparatus for guiding or steering vehicles, and more particularly to a steering control for traction drive members of self-propelled vehicles.

It is the most important object of the instant invention to provide in a transmission steering control mechanism, an arrangement wherein fore and aft, as well as left-right turns are effected through alternate connection of movable parts with oppositely rotating drive means disposed in coaxial relationship.

Another important object of the present invention is the provision of structure of the aforementioned character arranged to permit the operator to control each traction wheel throughout the entire cycle of forward movement, neutral and reverse movement, quickly and easily by virtue of a relatively short path of travel of parts to be manipulated.

Still another important object of the instant invention is to provide, through the medium of a simple alteration in certain components, a differential steering control that may be operated either through use of a steering wheel or a pair of hand levers.

Another important object of the present invention to provide an assembly that includes belt and pulley means as a part thereof, together with belt control means capable of maintaining such belts taut at all times, and under the direct control of the operator by virtue of a synchronized operable interconnection between the belt-tightening means and the transmission control.

Another object of the instant invention is to provide a unique, variable speed pulley system for carrying out the aforementioned objects and attaining the new results hereinafter to be made clear as the following specification progresses.

In the drawings:

FIG. 1 is a fragmentary, plan view partially in section illustrating one form of differential steering control embodying the concepts of the instant invention.

FIG. 2 is a fragmentary, cross-sectional view taken substantially on line 2—2 of FIG. 1 and illustrating the control essentially in elevation.

FIG. 3 is an enlarged, fragmentary, cross-sectional view taken substantially on line 3—3 of FIG. 1.

FIG. 4 is a fragmentary, cross-sectional view taken on line 4—4 of FIG. 3.

FIG. 5 is a fragmentary, cross-sectional view taken on line 5—5 of FIG. 2.

FIG. 6 is a view similar to FIG. 3 but illustrating a different position of certain component parts.

FIG. 9 is a cross-sectional view taken on line 9—9 of FIG. 7.

Figure 7:
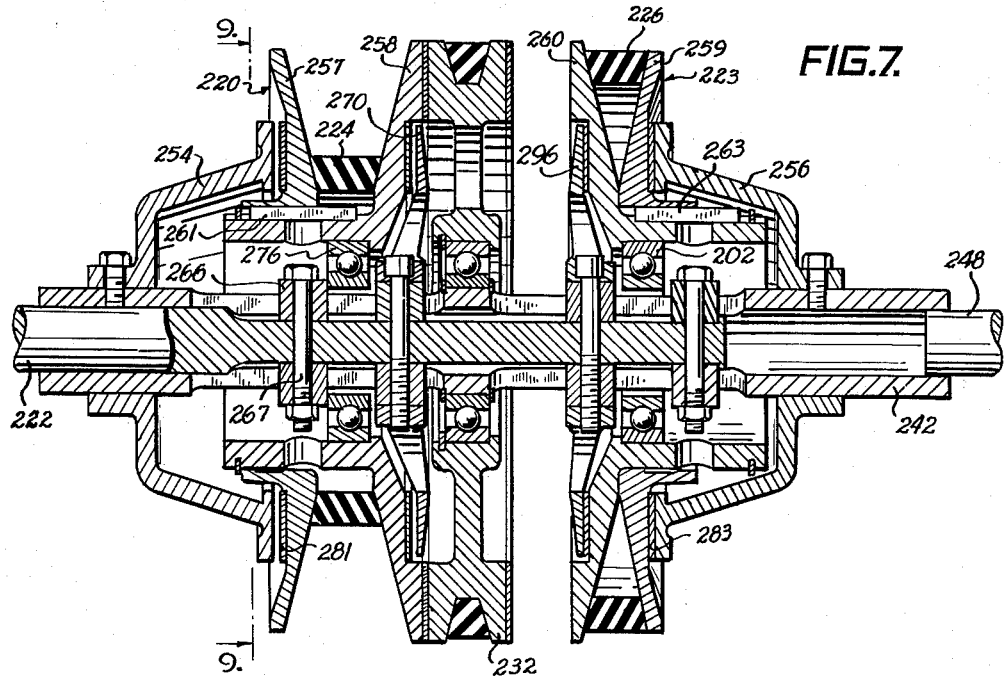
FIG. 7 is a view similar to FIGS. 3 and 6 showing a modified form of the invention.

In the embodiment illustrated in FIGS. 1-6 of the drawings, and referring first to FIG. 1, there is shown a pair of spaced driven shafts 12 and 14 in horizontal alignment and secured rigidly to corresponding driven pulleys 16 and 18 respectively. It is from these shafts 12 and 14 that a pair of corresponding ground-engaging traction wheels (not shown) of a vehicle such as a farm implement, may be driven and controlled either by a direct connection with the shafts 12 and 14 or by chain and sprocket wheel drives by way of example.

The pulleys 16 and 18 are connected with corresponding, variable speed drive pulleys 20 and 22 through the medium of continuous belts 24 and 26 respectively. The belts 24 and 26 are in turn provided with idler sheaves 28 and 30 respectively for maintaining belts 24 and 26 taut.

It is contemplated that shafts 12 and 14, and therefore, the aforementioned traction wheels, derive power for forward movement from the drive pulleys 20 and 22 and that the same be powered for reverse movement from a grooved wheel 32 medially disposed between the pulleys 20 and 22 and driven continuously in one direction by means of a belt 34 trained therearound.

Operator control for the components thus far described, includes a steering wheel not illustrated, and connected to the uppermost end of a rotatable steering shaft 36 operably connected with suitable gearing not shown, within a gear box 38 and arranged to rotate a stub shaft 40 as the steering wheel is manipulated.

Referring now to FIG. 3 of the drawings, it is seen that the pulleys 20 and 22, as well as the grooved wheel 32, are mounted on a tubular drive shaft 42 parallel with the shafts 12 and 14 and journalled within suitably supported bearings 44 and 46 (see also FIG. 1). Shaft 42 is driven continuously in one direction from output shaft 48 of a suitable prime mover 50 (see FIG. 1); another prime mover (not shown) may be operably coupled with belt 34 to drive the grooved wheel 32 in the opposite direction. To this end, therefore, it is seen that wheel 32 is freely rotatable on the shaft 42 by means of a bearing 52 which also serves to hold the wheel 32 against displacement longitudinally of the shaft 42.

Each of the pulleys 20 and 22 is provided with a pair of sections, the sections 54 and 56 whereof are rigidly secured to the shaft 42. Sections 58 and 60 of the pulleys 20 and 22 are, however, freely rotatable on the shaft 42 and reciprocable therealong toward and away from each other, and, therefore, toward and away from the centrally disposed wheel 32. To this end, shaft 42 is provided with a pair of diametrically opposed, longitudinal slots 62 and 64, slidably receiving keys 66 and 68 respectively that are in turn connected to a clutch member 70 whose hub surrounds the keys 66 and 68, clutch 70 being housed within the pulley section 58. By the same token, the hollow, frusto-conical pulley section 54 receives a tubular portion 72 of the pulley section 58, which tubular portion 72 terminates in a frusto-conical clutch surface 74 adapted to engage the similarly-shaped inner face of the pulley section 54 as shown in FIGS. 3 and 6.

The tubular portion 72 of pulley section 58 is rotatable on the shaft 42 through the medium of a bearing 76 whose inner race surrounds the keys 66 and 68, such keys being provided with notches 78 to permit limited movement of the keys 66 and 68 and, therefore, the clutch member 70 longitudinally of the shaft 42 and with respect to the bearing 76. A shoulder 80 on the tubular portion 72 limits movement of the bearing 76 in one direction.

An annular band 82 of frictionable material on one face 84 of pulley section 58, is adapted to be engaged by the clutch member 70 as seen in FIGS. 3 and 6, and the tubular portion 72 of pulley section 58 has a groove 86 surrounding the same and adapted to receive the belt 24 when the pulley section 58 is shifted a predetermined distance away from the pulley section 54.

Corresponding identical parts are provided in the pulley 22, including slots 88 and 90 in the shaft 42, keys 92 and 94, clutch 96, tubular portion 98, clutch surface 100, bearing 102, notches 104, shoulder 106, band 108 on face 110 of pulley section 60, and groove 112 in tubular portion 98 shown receiving the belt 26 in FIG. 3.

It is also to be noted in FIGS. 1, 3 and 6, that innermost annular faces 114 and 116 of pulley sections 58 and 60 respectively, are adapted to alternately engage corresponding proximal, annular bands 118 and 120 respectively, made from frictionable material and secured rigidly to the wheel 32.

An elongated rod 122 telescoped within the shaft 42 for reciprocation longitudinally thereof, is secured to shaft 42 for rotation therewith by use of a key 124. A spring 126 coiled about the rod 122 bears at one end thereof against keys 66 and 68 and at its opposite end against the keys 92 and 94, thereby yieldably biasing the same apart. Rod 122 is also reciprocable relative to the four keys, the keys 66 and 68 being engaged by a shoulder 128 on the rod 122 when the latter is shifted in one direction, and the keys 92 and 94 being engaged by a nut 130 on the rod 122 when the latter is shifted in the opposite direction. That end of the rod 122 opposite to nut 130 is journalled within and attached to a coupling 132 having a transverse pivot pin 134 attached thereto.

Referring again to FIGS. 1, 2 and 3, it is seen that the rod 122 is coupled with a horizontal arm 136 swingable about a pivot pin 138 and pivotally coupled with pin 134 rigidly secured to coupling 132. The stub shaft 40 has a substantially T-shaped control 140 rigidly secured thereto and pivotally coupled with the arm 136 through the medium of a link 142.

The idler sheaves 28 and 30 engage the outer faces of the belts 24 and 26 along the upper stretches thereof between the drive and driven pulleys. They are adjustably mounted on vertically swingable bars 144 and 146 respectively, such bars being supported by corresponding stub shafts 148 and 150 respectively. A stop strip 152 secured to gear box 38 is disposed for engagement by the bars 144 and 146 to limit the extent of upward swinging movement thereof. Downward movement of the bars 144 and 146 is, however, effected by fingers 154 and 156 engaging lateral lugs 158 and 160 on bars 144 and 146 respectively, the fingers 154 and 156 forming an integral part of the control 140.

It is to be noted at this juncture, particularly by viewing FIG. 5, that when one of the idler sheaves 28 or 30 is held downwardly at the lowermost end of its path of travel by the control 140, the other idler sheave 28—30 is free insofar as the control 140 is concerned, since its corresponding finger 154—156 is then out of engagement with the proximal lug 158—160. However, under such conditions the belt 24—26 of the higher idler sheave 28—30 is still held taut since stop strip 152 limits the extent of upward movement of the bars 144 and 146.

Assuming that the shafts 12 and 14 are disposed forwardly of the shaft 42 insofar as the mobile vehicle is concerned, FIGS. 1–5 illustrate the position of all components during execution of a sharp turn to the left, whereas FIG. 6 shows components in their operative position when the vehicle moves forwardly along a straight path of travel. When the drive pulleys 20 and 22 are in the position illustrated in FIG. 6, the control 140 is midway between the ends of its path of travel with its fingers 154 and 156 engaging lugs 158 and 160. The idler sheaves 28 and 30 and bars 144 and 146 will be horizontally aligned and equal tension will be exerted on the belts 24 and 26. Under such conditions the rod 122 will also be intermediate the ends of its path of reciprocable movement, exerting no pressure on the keys 66—68 and 92—94 in either direction. This permits the spring 126 to expand fully and separate the keys to their fullest extent.

It is noted in FIG. 6 that through the keys 66, 68, 92 and 94, spring 126 exerts forces on the clutch members 70 and 96 such as to cause the latter to in turn clamp the pulley sections 58 and 60 against their corresponding pulley sections 54 and 56. More particularly, the clutch faces 74 and 100 are held in tight frictional engagement with pulley sections 54 and 56 respectively. The pulleys 20 and 22 being at their maximum diameter, their belts 24 and 26 ride adjacent the outer peripheries of the variable speed pulleys; therefore, driven pulleys 16 and 18 are rotated at the fastest speed which the drive pulleys are capable of driving the pulleys 16 and 18.

Noteworthy is the fact that rotating forces are applied to the pulley sections 58 and 60, from the shaft 42, through the keys 66—68 and 92—94, thence through the clutches 70 and 96, because of their direct engagement with the bands 82 and 108 on the pulley sections 58 and 60. By the same token, rotative forces are transmitted from shaft 42, through the pulley sections 54 and 56, and thence through the clutches 74 and 100 to the pulley sections 58 and 60. During this time, wheel 32 rotates continuously in the opposite direction without any effect upon the pulleys 20 and 22 because of the spacing that is apparent in FIG. 6 between the pulley sections 58 and 60 and the wheel 32.

When the steering wheel is manipulated to rotate shaft 36 and, therefore, shaft 40, rod 122 is caused to move and simultaneously, the bars 144 and 146 swing within their vertical planes. Assuming that the steering wheel is turned in a direction to cause bar 146 to swing downwardly as seen in FIG. 2, as finger 156 acts on lug 160, finger 154 will rise to clear the lug 158 and permit bar 144 to rise until it engages the stop strip 152. This progressively tightens the belt 26 and gradually loosens the belt 24. At the same time, rod 122 is pulled from the position shown in FIG. 6, outwardly to the position shown in FIG. 3 because of the operable connection between control 140 and the rod 122 which includes the arm 136 and the link 142.

As rod 122 moves outwardly in this manner, the nut 130 moves into engagement with the keys 92 and 94 as the shoulder 128 moves away from the keys 66 and 68. This compresses spring 126 since the keys 66 and 68 cannot follow the outward movement of the rod 122 because of the engagement of clutch 70 with band 82 and the engagement of clutch 74 with the pulley section 54.

It follows, therefore, that movement of the keys 92 and 94 to the left, viewing FIG. 3, will shift the clutch 96 toward the wheel 32 and permit pulley sections 60 to move in the same direction as the slack in belt 26 is taken up by the downward movement of idler sheave 30.

It is now seen that rod 122 is moving to the left, belt 26 is gradually moving inwardly toward the groove 112, but all the while engaging both pulley sections 56 and 60. Accordingly, the speed of rotation of the driven pulley 18 progressively decreases, causing the vehicle to commence turning to the left. Simultaneously, with the release by clutch 96 of its frictional grip on band 108, belt 26 slips into the groove 112 and the pulley 18 comes to rest; under such conditions, a relatively sharp turn may be made since the left traction wheel is stationary, while the right traction wheel is continuously driven by the belt 24.

If, however, it is desired to increase the sharpness of the turn, rod 122 is shifted to the extreme lefthand end of its path of travel, thereby moving the pulley sections 60 into engagement with the frictional band 120 on wheel 32. The left friction wheel operating from driven pulley 18 then commences rotating in reverse by the power received from reversing wheel 32, through pulley section 60 and belt 26. With the left wheel rotating in reverse and the right wheel still rotating forwardly, the sharp turn may be continued until the operator manipulates the steering wheel to return all parts to the position shown in FIG. 6.

Manifestly, when the rod 122 is shifted from the position shown in FIG. 3 to the position shown in FIG. 6, the spring 126 will cause the keys 92 and 94 to follow the nut 130 until the clutch elements 96 and 100 are in engagement with the pulley sections 60 and 56 respectively.

It is believed from the foregoing that the manner in which a right-hand turn is executed becomes obvious, since in that instance, shoulder 128 comes into engagement with the keys 66 and 68 as the nut 130 moves away from the keys 92 and 94. Also, under such conditions the bar 144 and its sheave 28 swing downwardly as the bar 146 and its sheave 30 swing upwardly. While, for the most part tightening of the belts 24 and 26 to the position where the same are fully seated in their grooves 86 and 112, as the case may be, will suffice to hold the sections 58 and 60 into operative relationship to the wheel 32, it is to be noted that additional force is applied to such shiftable sections 58 and 60 from the rod 122, through the keys 66, 68, 92 and 94 and through the bearings 76—102 and shoulders 80 and 106. On the other hand, there is always a resilient bias on the sections 58 and 60 through the spring 126 whenever the pulleys 20 and 22 are operating to drive their corresponding traction wheels forwardly.

It is manifest from the foregoing also that, in view of the belt-tightening means 28 and 30, spring-loaded, variable speed sheaves might be used in place of the pulleys 16 and 18, but the operator would not have the direct control over the belt tightness as is made possible through the construction above described and illustrated in FIGS. 1, 2 and 5.

Figure 8:
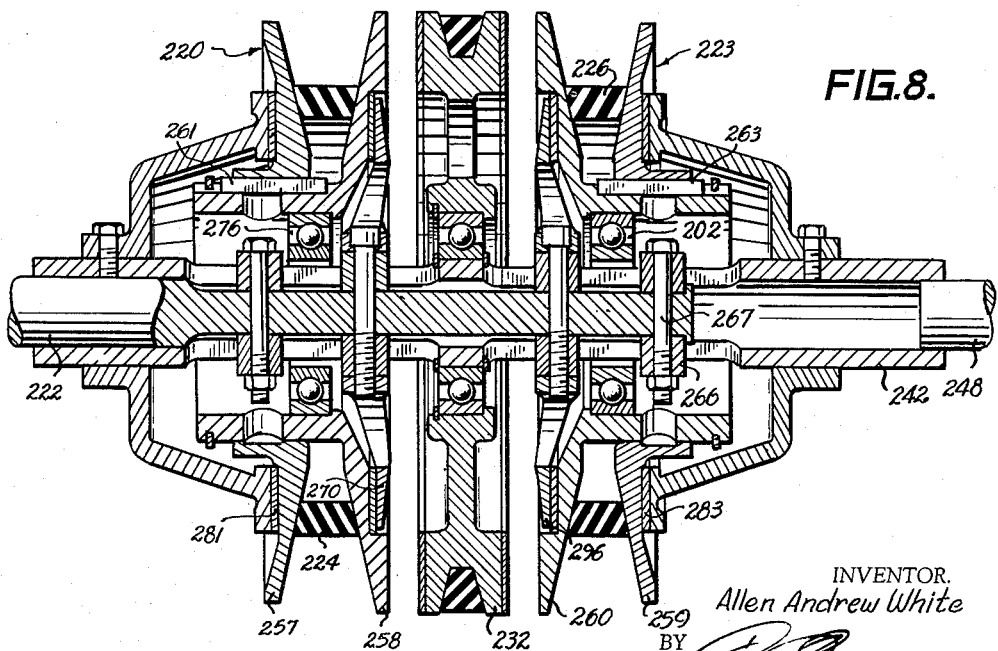
FIG. 8 is a view similar to FIG. 7 but illustrating certain components in a different position.

Referring now to the embodiment shown in FIGS. 7–9, it is immediately apparent that spring 126 above referred to, has been eliminated, but in all essential respects this embodiment operates the same as the form shown in FIGS. 1–6. Rod 222 is reciprocable within tubular shaft 242 and the latter is rigidly connected to the output shaft 248 of a suitable prime mover. Reversing wheel 232 is again freely rotatable on the shaft 242, but in the opposite direction, and there is provided a pair of variable speed drive pulleys 220 and 223, together with their belts 224 and 226. However, pulley 220 is provided with a pair of shiftable sections 257 and 258 and a similar pair of shiftable sections 259 and 260 are provided in the pulley 223. Drive elements 254 and 256 for pulleys 220 and 223 respectively, are secured rigidly to the shaft 242 for rotation therewith, and correspond therefore, with the rigid pulley sections 54 and 56 shown in FIGS. 3 and 6.

Sections 258 and 260 are rotatable on the shaft 242 through the medium of bearings 276 and 202. The sections 257 and 259 on the other hand, are shiftable on the corresponding sections 258 and 260, but held against rotation with respect thereto by keys 261 and 263.

A plurality of separate keys all designated by the numeral 266 and reciprocable longitudinally of the shaft 242, are connected to the rod 222 by bolts 267, thereby causing the rod 222 to rotate with the shaft 242. Note that the bearings 276 and 202 are each embraced by a pair of bolts 267 and, therefore, by two pairs of keys 266. Two of such bolts 267 also serve to attach clutches 270 and 296 to the rod 222. When the pulley sections 257 and 259 are operably connected with the drive elements 254 and 256, the latter engage frictional bands 281 and 283 secured to pulley sections 257 and 259 respectively.

The relative positions of the components are shown in FIG. 8 as the same appear when the vehicle is driven forwardly in a straight line. Note that the belt-tightening means is holding belts 224 and 226 in positions where sections 257 and 258 are spread tightly against the drive element 254 and the clutch 270, and where pulley sections 259 and 260 are spread against the drive element 256 and the clutch 296. All of the components of both pulleys 220 and 223 are, therefore, being driven through power transmitted from shaft 248 to shaft 242.

When the rod 222 is shifted, to the right for example, as shown in FIG. 7, belt 224 is progressively tightened as belt 226 is gradually slackened. Hence, belt 224 gradually moves inwardly, decreasing the speed of forward movement of its traction wheel, and belt 226 moves outwardly, progressively increasing the speed of its corresponding traction wheel. Shifting of the rod 222 to the right permits such action of the belt-tightening means and such movement of the belts 224 and 226 toward the positions illustrated in FIG. 7.

Prior to engagement of the section 258 with wheel 232, drive element 254 and clutch 270 will have released their frictional hold on the pulley 220 and the latter will come to rest. A relatively sharp turn is, therefore, effected because belt 226 is near the outer periphery of pulley 223 and operating at full forward speed.

Obviously, additional movement of rod 222 and additional tightening of belt 224 will cause the pulley 220 to become operably coupled with the reversing member 232, whereupon one traction wheel of the vehicle will move in reverse as the other traction wheel rotates forwardly. The embodiment of FIGS. 10 and 11 makes it possible to utilize much the same arrangement as in FIGS. 7–9 to also permit driving the vehicle in reverse along a straight path of travel without need for separate reversing means as would be needed in the embodiments hereinabove described. To do so however, the advantages of the steering wheel must be foregone and in lieu thereof, there is provided a pair of levers 300 and 302 swingable about stub shafts 304 and 306 common to corresponding bars 308 and 310 for belt-tightening sheaves 312 and 314. Bars 308 and 310 are depressed by lateral loops 316 and 318 that engage the bars 308 and 310 when the levers 300 and 302 are pulled rearwardly. Note however, that loops 316 and 318 move out of engagement with the bars 308 and 310 when the levers 300 and 302 are swung to the forwardmost ends of their paths of travel because of stop means 320 which limit the extent of upward swinging movement of the bars 308 and 310.

As aforementioned, driven pulleys 322 and 324 are identical with variable speed pulleys 220 and 223 (FIG. 7) and need not be re-described. However, there is provided a pair of spaced, reciprocable control rods 326 and 328 within tubular drive shaft 330, one for each pulley 322 and 324 respectively The rod 326 is operably coupled with the lever 300 through arm 332, crank 334, link 336 pivotally interconnecting crank 334 and arm 332, and link 338 pivotally interconnecting lever 300 and crank 334.

In the same manner, the connection between lever 302 and rod 328 includes an arm 340, a crank 342 and a pair of links 344 and 346.

The arrangement is such that when the levers 300 and 302 are both swung forwardly, the position of belts 348 and 350 in the pulleys 322 and 324 respectively, will be as illustrated in FIG. 8 of the drawings, the vehicle being driven forwardly along a straight path of travel.

Conversely, when both levers 300 and 302 are swung rearwardly, both belts 348 and 350 will be drawn inwardly and the pulleys 322 and 324 will be operably coupled with reversing member 352 driving the vehicle in reverse along a straight path of travel.

Figure 10:
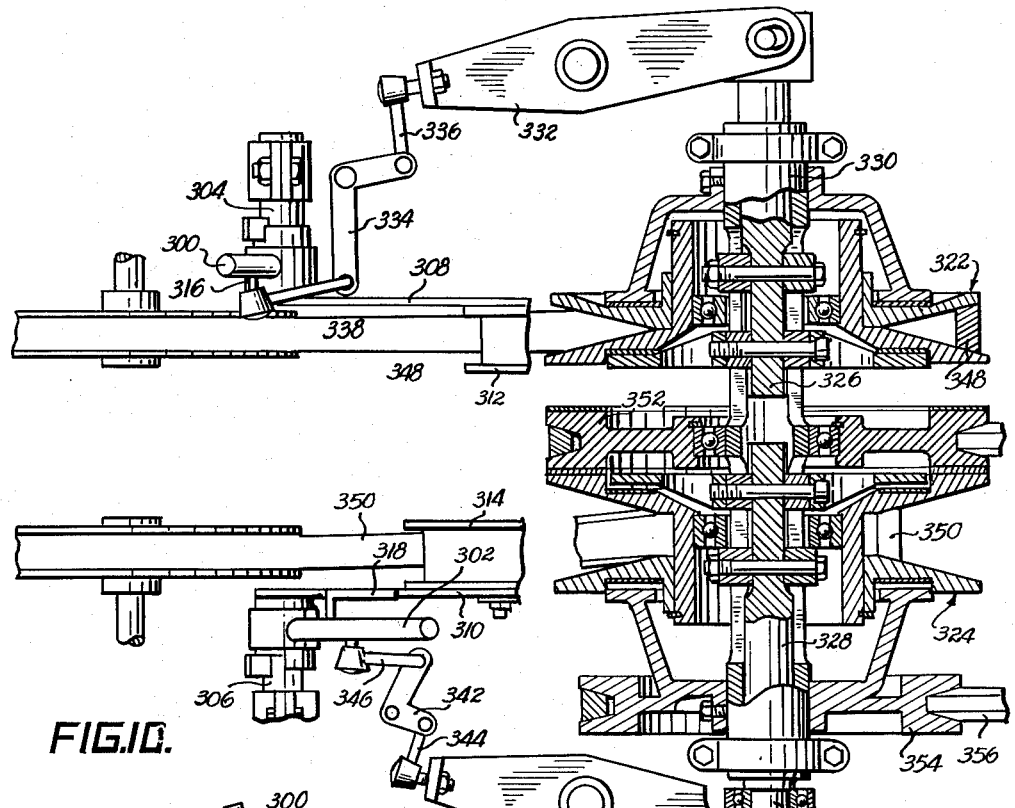
FIG. 10 is a view similar to FIG. 1, parts being broken away and in section and showing another modification of the instant invention.
Figure 11:
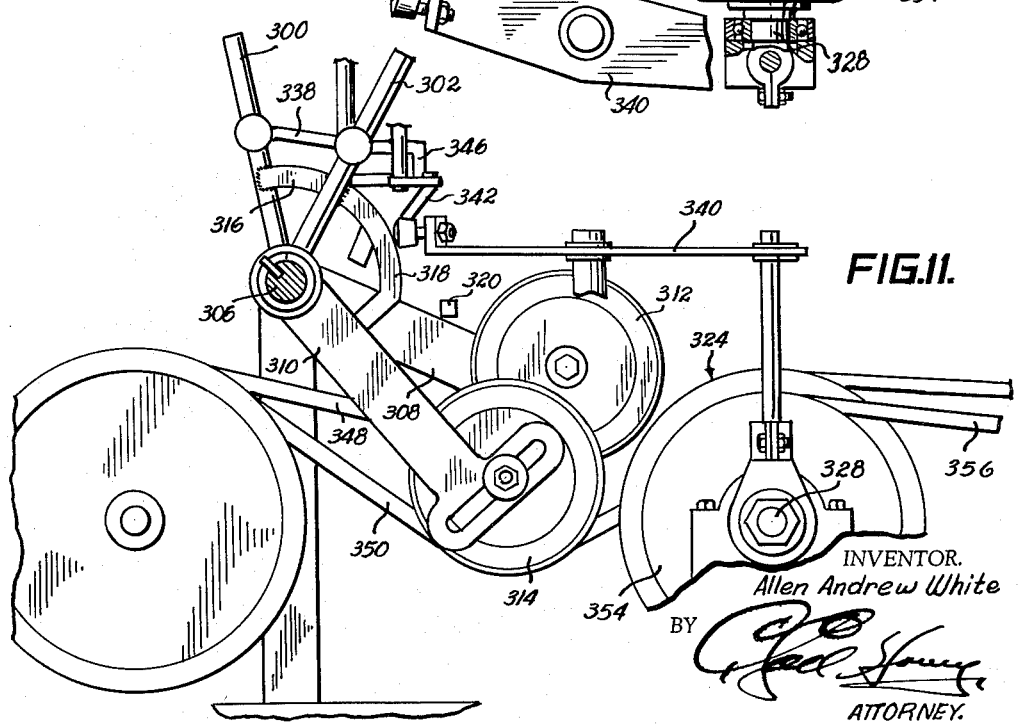
FIG. 11 is a view similar to FIG. 2 showing the embodiment of FIG. 10.

When the components are positioned as shown in FIGS. 10 and 11 with lever 300 swung forwardly and lever 302 swung rearwardly, pulley 322 continues to drive its traction wheel forwardly, whereas pulley 324 drives its corresponding traction wheel in reverse, thereby causing the vehicle to execute a sharp turn to the left.

It is quite clear that the operator can easily manipulate the levers 300 and 302 fore and aft to cause either traction wheel to rotate forwardly, in reverse, or come to a standstill. By the same token, fine-line steering is made possible since the diameters of the pulleys 322 and 324 are varied during actuation of levers 300 and 302, causing the vehicle to veer to the left or to the right as may be desired, while the reversing wheel 352 continues to rotate freely in a direction opposite to the direction of rotation of shaft 330 and the rods 326 and 328.

It is manifest that any suitable conenction may be made between the prime mover and the shaft 330 and there is, therefore, illustrated in FIGS. 10 and 11, a drive sheave 354 coupled with shaft 330 and driven from the prime mover by a belt 356.

Having thus described the invention what is claimed as new and desired to be secured by Letters Patent is:

1. In a transmission, a pair of belt and pulley units, each including a drive pulley, a driven pulley and a belt interconnecting the pulleys; a driven shaft operably associated with each driven pulley respectively; a drive shaft common to the drive pulleys, each drive pulley being provided with a section having a cone-shaped, belt-engaging surface, said section being shiftable on the drive shaft whereby the diameters of the drive pulleys may be varied; means connecting the drive pulleys with the drive shaft for rotation in one direction by the latter when said sections are shifted to one end of their paths of travel; and means for rotating the driven pulleys in the opposite direction through said sections and said belts when the sections are shifted to the opposite end of said paths of travel.

2. The invention of claim 1, and means for maintaining the belts taut as said sections are shifted.

3. The invention of claim 1, said driven pulleys being driven at the same rate when the sections are intermediate said ends of their paths of travel.

4. In a transmission, a pair of belt and pulley units, each including a drive pulley, a driven pulley and a belt interconnecting the pulleys; a driven shaft operably associated with each driven pulley respectively; a drive shaft common to the drive pulleys and rotatable continuously in one direction, each drive pulley being provided with a section having a cone-shaped, belt-engaging surface, said section being shiftable on the drive shaft whereby the diameters of the drive pulleys may be varied; a reversing member between said sections and rotatable continuously on the drive shaft in the opposite direction; means connecting the drive pulleys with the drive shaft for rotation thereby when the sections are shifted to one end of their paths of travel; and structure for shifting said sections to the opposite end of said paths of travel into operative relationship with said member for rotation of the driven pulleys by the member through said sections and said belts.

5. The invention of claim 4, said structure including clutch means for each section respectively, reciprocable along the drive shaft and rotatable therewith, the clutch means connecting said sections with the drive shaft when the sections are at said one end of their paths of travel.

6. The invention of claim 4, said structure including manual control means and means responsive to the actuation of said control means for maintaining the belts taut as said sections are shifted.

7. The invention of claim 6, said means for maintaining the belts taut comprising belt-engaging idlers swingable to and from a position taking up the slack in the belts between the drive and driven pulleys.

8. The invention of claim 7, and delayed action means permitting swinging of each idler toward a belt-slackening position prior to swinging of the other idler toward a belt-tightening position.

9. The invention of claim 4, and resilient means yieldably biasing said sections toward said one end of their paths of travel.

10. In a transmission, a pair of belt and pulley units, each including a drive pulley, a driven pulley and a belt interconnecting the pulleys; a driven shaft operably associated with each driven pulley respectively; a drive shaft common to the drive pulleys and rotatable continuously in one direction, each drive pulley being provided with a section rigid to the drive shaft and a section shiftable on the drive shaft toward and away from the rigid section, said sections each having a cone-shaped, belt-engaging surface, whereby the diameters of the drive pulleys may be varied; a reversing member between said sections and rotatable continuously on the drive shaft in the opposite direction; resilient means between the shiftable sections yieldably biasing the same toward one end of their paths of travel adjacent corresponding rigid sections whereby the drive pulleys drive the driven shafts from the drive shaft through the belts; and structure for shifting said shiftable sections to the opposite end of said paths of travel into operative relationship with said member for rotation of the driven pulleys by the member.

11. The invention of claim 10, said sections being provided with interengaging clutch means when the same are together whereby rotative force is imparted to the shiftable sections from the rigid sections.

12. The invention of claim 10, the shiftable sections being freely rotatable on the drive shaft when the same are disposed intermediate said ends of their paths of travel.

13. The invention of claim 10, said structure including clutch means for each shiftable section respectively, reciprocable along the drive shaft and rotatable therewith, the clutch means connecting the drive shaft with the shiftable sections when the latter are at said one end of their paths of travel.

14. In a transmission, a pair of belt and pulley units, each including a drive pulley, a driven pulley and a belt interconnecting the pulleys; a driven shaft operably associated with each driven pulley respectively; a drive shaft common to the drive pulleys and rotatable continuously in one direction; a reversing member between the drive pulleys and rotatable continuously on the drive shaft in the opposite direction; a drive element for each drive pulley respectively rigidly secured to the shaft; and structure for shifting the drive pulleys alternately into frictional, driving engagement with said member or corresponding drive elements.

15. The invention of claim 14, each drive pulley having a pair of relatively shiftable sections whereby the diameters thereof may be varied.

16. The invention of claim 15, said structure including means for clamping the sections together and against the drive elements.

17. The invention of claim 16, and a reciprocable actuator operably coupled with the sections and the clamping means.

18. In a transmission, a pair of belt and pulley units, each including a drive pulley, a driven pulley and a belt interconnecting the pulleys; a driven shaft operably associated with each driven pulley respectively; a drive shaft common to the drive pulleys and rotatable continuously in one direction, each drive pulley being provided with a section having a cone-shaped, belt-engaging surface, said section being shiftable on the drive shaft whereby the diameters of the drive pulleys may be varied; a reversing member between said sections and rotatable continuously on the drive shaft in the opposite direction; means connecting the drive pulleys with the drive shaft for rotation thereby when the sections are shifted to one end of their paths of travel; means operably connecting the sections with said member when the sections are shifted to the opposite end of said path of travel; and structure for each section respectively for shifting the same.

19. The invention of claim 18, and means operably coupled with each of said structures respectively and responsive to actuation of the latter for maintaining the corresponding belts taut as said sections are shifted.

20. In a transmission, a pair of belt and pulley units, each including a drive pulley, a driven pulley and a belt interconnecting the pulleys; a driven shaft operably associated with each driven pulley respectively; a drive shaft common to the drive pulleys, each drive pulley being provided with a section having a cone-shaped, belt-engaging surface, said section being shiftable on the drive shaft whereby the diameters of the drive pulleys may be varied; means connecting the drive pulleys with the drive shaft for rotation in one direction by the latter when said sections are shifted to one end of their paths of travel, said driven pulleys being driven at the same rate when the sections are intermediate the ends of their paths of travel; and clutch means for each section respectively, reciprocable along the drive shaft and rotatable therewith, the clutch means connecting said sections with the drive shaft when the sections are at said one end of their paths of travel.

References Cited in the file of this patent

UNITED STATES PATENTS

| | | |
|---|---|---|
| 808,878 | Smith | Jan. 2, 1906 |
| 2,185,537 | Brownlee | Jan. 2, 1940 |
| 2,311,393 | Honeywell | Feb. 16, 1943 |
| 2,420,100 | Salsbury | May 6, 1947 |
| 2,595,229 | Curtis | May 6, 1952 |
| 2,831,357 | Davies | Apr. 22, 1958 |